United States Patent [19]
Muramatsu et al.

[11] Patent Number: 5,565,943
[45] Date of Patent: Oct. 15, 1996

[54] LENS-FITTED PHOTO FILM UNIT

[75] Inventors: Katsuji Muramatsu; Hisashi Tasaka; Yuji Mikami, all of Kanagawa, Japan

[73] Assignee: Fuji Photo Film Co., Ltd., Kanagawa, Japan

[21] Appl. No.: 597,186

[22] Filed: Feb. 6, 1996

[30] Foreign Application Priority Data

Feb. 7, 1995 [JP] Japan ................................. 7-019282
May 11, 1995 [JP] Japan ................................. 7-113254

[51] Int. Cl.⁶ .................................................. G03B 15/05
[52] U.S. Cl. ........................................... 396/6; 396/176
[58] Field of Search ......................... 354/127.1, 127.11, 354/127.12, 149.11, 288, 486

[56] References Cited

U.S. PATENT DOCUMENTS

| | | | |
|---|---|---|---|
| 5,003,330 | 3/1991 | Kotani et al. | 354/149.11 |
| 5,047,792 | 9/1991 | Asano et al. | 354/149.11 |
| 5,235,364 | 8/1993 | Ohmura et al. | 354/149.11 |
| 5,315,332 | 5/1994 | Hirasaki et al. | 354/149.11 |
| 5,361,111 | 11/1994 | Yamashina et al. | 354/127.1 |
| 5,432,572 | 7/1995 | Hirasaki et al. | 354/149.11 |

*Primary Examiner*—A. A. Mathews
*Attorney, Agent, or Firm*—Young & Thompson

[57] ABSTRACT

A lens-fitted photo film unit has photo film pre-contained in a photo film containing section (14, 70). An exposure is taken on the photo film via a photographic light path (20). An electronic flash device (16) is secured in front of the photo film containing section. The electronic flash device includes a circuit board (27, 69) having a flash circuit, a flash-emitting section, and a charge switch for charging the flash circuit. The charge switch includes two contact points (32a, 32b, 69a, 69b) and a movable switch segment (33, 68a) for contact with the contact point to switch on charging of the flash circuit. A front cover (18, 60, 91) is secured to cover a front of the circuit board. The switch segment is depressible for coming in contact with the contact point. An operable lever (12, 63, 94) is associated with the front cover in rotatable fashion between an erected position and a folded position relative to the front cover. The switch segment is kept depressed when the operable lever has the erected position.

28 Claims, 15 Drawing Sheets

F I G. 3
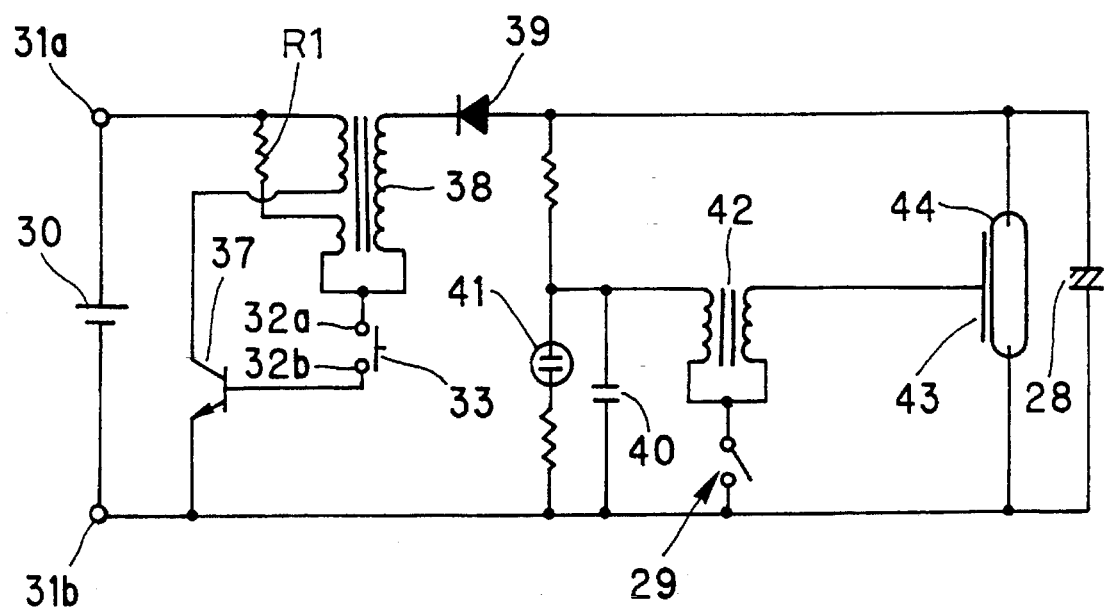

5,565,943

LENS-FITTED PHOTO FILM UNIT

BACKGROUND OF THE INVENTION

1. Field of the Invention

The present invention relates to a lens-fitted photo film unit. More particularly, the present invention relates to a lens-fitted photo film unit incorporating an electronic flash device and being improved in view of convenience in charging operation of the flash device.

2. Description Related to the Prior Art

Lens-fitted photo film units are a single-use camera pre-loaded with photo film, and provided with simple mechanisms for effecting exposure, such as a shutter with a taking lens. A known photo film unit is disclosed in the commonly assigned U.S. Pat. No. 5,361,111 (corresponding to JP-A (Japanese Patent Laid-open Publication No.) 5-100302). Plural variants of photo film units are commercially available, including a flash built-in type "Fujicolor Quick Snap Flash" (trade name; manufactured by Fuji Photo Film Co., Ltd.). A flash device incorporated in the lens-fitted photo film unit includes a flash-emitting section having a discharge tube, and printed circuit board having a flash circuit. For flash photography, an operable portion disposed in front of the lens-fitted photo film unit is operated, to turn on a flash charge switch, so that a main capacitor of the printed circuit board is charged. After illumination at a lamp or an indicator of other structures is checked as a sign of finish of the charging, a shutter release button is depressed. Flash light is emitted at the same time as the release of the shutter.

The flash charge switch has a simplified structure in consistency with a low price of the lens-fitted photo film unit, and includes two contact points and a switch segment. The contact points are arranged on the printed circuit board, contacted on the switch segment, and short-circuited. In response the flash circuit is closed to start operation of the charging. Various examples of operable portions are known: a retainable sliding type in which a retaining mechanism is operated to retain the switch segment in contact with the contact points; and an unretained type in which the switch segment is contacted on the contact points only during depression of the operable portion with a user's finger. The unretained type has either of a pushbutton structure and a sliding structure. In general, the operable portion is formed integrally with a front cover of the lens-fitted photo film unit, and shiftable toward the switch segment with resiliency.

The known operable portion of the unretained type for the flash charging is inconvenient in use for taking plural successive exposures with flash light. The operable portion must be moved every time immediately after taking one exposure and before taking another with flash light, in course of taking plural successive exposures. The known operable portion of the retainable type in association with a retaining mechanism is inconvenient in use for taking only one exposure with flash light. Although the operable portion is moved for one time before taking plural successive exposures with flash light, the operable portion must be moved for two times before taking only one exposure: moved to the charging position and then back to the initial position without charging. If a user is not accustomed to using the lens-fitted photo film unit, it is likely that the lens-fitted photo film unit is left to stand with the operable portion set in the charging position for a long time, until all power of a battery is wasted, to disable the flash device from operating for the remaining ones of all photographable frames of the photo film.

SUMMARY OF THE INVENTION

In view of the foregoing problems, an object of the present invention is to provide a lens-fitted photo film unit incorporating an electronic flash device convenient both for taking plural successive exposures with flash light and for taking only one exposure with flash light.

Another object of the present invention is to provide a lens-fitted photo film unit incorporating an electronic flash device in which a flash charge switch is so operable for a user not to forget to turn off the flash charge switch.

In order to achieve the above and other objects and advantages of this invention, there are at least one contact point and a movable switch segment for contact with the contact point to switch on charging of the flash circuit. A front cover is secured to cover a front of the circuit board. The switch segment is depressible for coming in contact with the contact point. An operable latch device is associated with the front cover in shiftable fashion between a latch position and a home position relative to the front cover. The switch segment is kept depressed when the operable latch device has the latch position.

In a preferred embodiment, an operable lever has first and second ends, the first end being disposed in front of the switch segment, the second end being disposed opposite to the first end with reference to a face of the front cover. A support structure supports the operable lever in shiftable fashion between erected and folded positions, the second end being erected from the front cover when having the erected position, and being folded down on the front cover when having the folded position. When having the erected position, the first end depresses the switch segment for contact with the contact point.

An access opening is formed in the front cover, the operable lever being disposed at the access opening, the first end depressing the switch segment through the access opening.

A flap portion has fixed and free ends, the fixed end being disposed behind the second end of the operable lever having the folded position and formed in connection to an edge of the access opening in the front cover, the free end being disposed between the switch segment and the first end of the operable lever, and depressed by the first end to depress the switch segment.

BRIEF DESCRIPTION OF THE DRAWINGS

The above objects and advantages of the present invention will become more apparent from the following detailed description when read in connection with the accompanying drawings, in which:

FIG. 3 is a diagram schematically illustrating a flash circuit of a flash device;

DETAILED DESCRIPTION OF THE
PREFERRED EMBODIMENT(S) OF THE
PRESENT INVENTION

Figure 1:
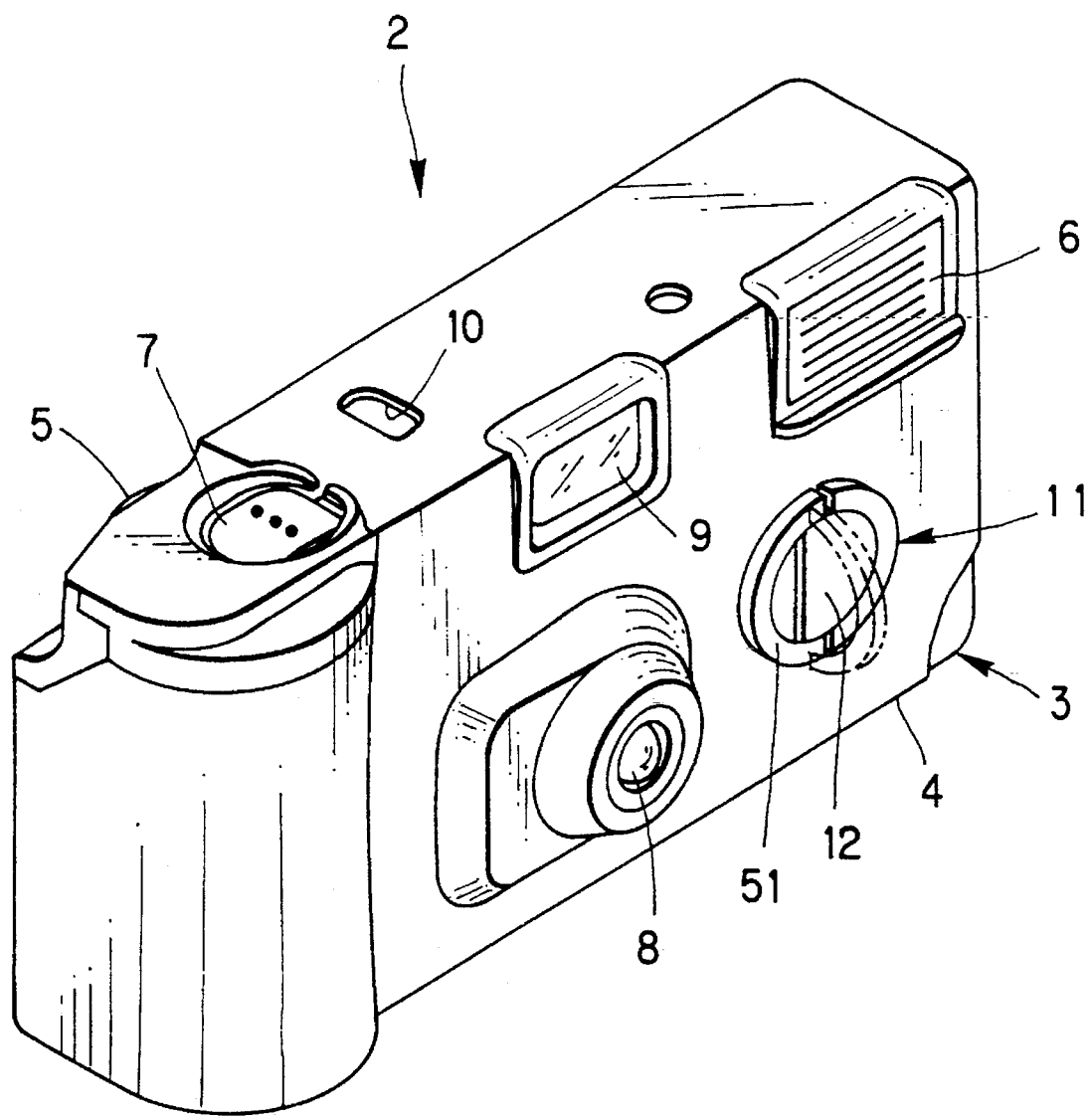
FIG. 1 is a perspective view illustrating a lens-fitted photo film unit of the present invention.

FIG. 1 illustrates a lens-fitted photo film unit 2 of the present invention. A film housing 3 incorporates a photograph-taking mechanism, and is covered in a cardboard wrapper 4. The lens-fitted photo film unit 2 is a type whose back-to-front thickness is reduced. In the cardboard wrapper 4 are formed openings through which a winding wheel 5, a flash-emitting section 6, a shutter release button 7, a taking lens 8, a viewfinder 9, and a frame counter window 10 emerge externally. Under the flash-emitting section 6 is located a flash charge button 11. The flash charge button 11 has an operable lever 12 as latch device, which is swingable to an erected position erected perpendicularly to the front of the lens-fitted photo film unit 2 as indicated by the phantom line, for the purpose of charging operation for consecutive plural times respectively prior to an exposure.

Figure 2:
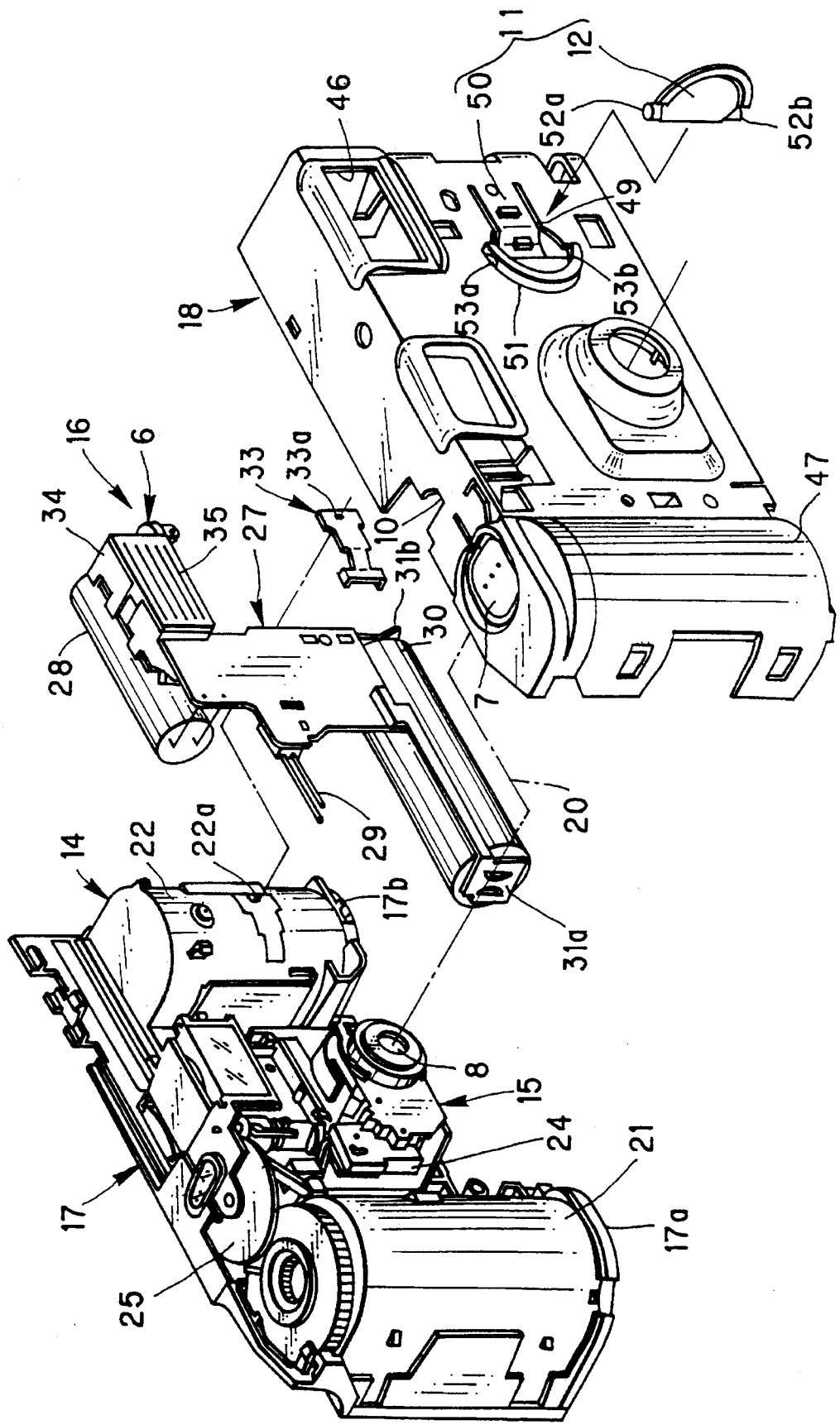
FIG. 2 is an exploded perspective view illustrating the lens-fitted photo film unit.

The photo film housing 3, as shown in FIG. 2, is constituted by a photo film containing section 14, an exposure section 15, an electronic flash device 16, a rear cover 17 and a front cover 18, which are assembled together in engagement of hooks.

The photo film containing section 14 is formed of opaque plastics. A photographic light path 20 is defined through the center of the photo film containing section 14. A cassette containing chamber 21 and a photo film roll chamber 22 are formed integrally with the photo film containing section 14, to locate the light path 20 between the cassette containing chamber 21 and the photo film roll chamber 22. A front wall of the cassette containing chamber 21 is protruded to the front beyond a position of a front wall of the photo film roll chamber 22.

The rear cover 17 is formed of opaque plastics, secured to the rear of the photo film containing section 14, and maintains the cassette containing chamber 21 and the photo film roll chamber 22 in light-tight fashion. The rear cover 17 is provided with lids 17a and 17b of a pull-top type for closing bottoms of the cassette containing chamber 21 and the photo film roll chamber 22. The lid 17a is adapted to removal of the cassette after inclusion of the photo film as exposed.

The exposure section 15 has a base part 24 formed of opaque plastics, and includes a frame counter wheel 25 for indicating the number of available remaining frames, as well as a photo film retaining mechanism and a shutter mechanism inclusive of a shutter blade. The taking lens 8 is mounted in front of the base part 24. The viewfinder 9 is mounted on the top of the base part 24. The exposure section 15 is mounted in front of the photo film containing section 14 in removable fashion.

The flash device 16 is constituted of a printed circuit board 27 and the flash-emitting section 6. The printed circuit board 27 includes a main capacitor 28, electrical parts, synchro switch 29, contact segments 31a and 31b. The main capacitor 28 is included in a flash circuit. The synchro switch 29 is turned on by the shutter mechanism of the exposure section 15. The contact segments 31a and 31b are adapted to connection of a dry battery 30 of the flash device 16.

The printed circuit board 27 includes two contact points 32a and 32b to be connected together for charging the flash circuit. A switch segment 33 is disposed to confront with the contact points 32a and 32b, for short-circuit the contact points 32a and 32b to start charging. The switch segment 33 is secured to the front wall of the photo film roll chamber 22 of the photo film containing section 14. A pin 22a is inserted in a securing hole 33a, to position the switch segment 33 between the photo film containing section 14 and the front cover 18. When the flash charge button 11 is depressed, the switch segment 33 is contacted on the contact points 32a and 32b. The flash-emitting section 6 includes a retaining frame 34 of plastics, a discharge tube for flash emission, a concave reflector for reflecting flash light to the front, and a distribution compensating plate 35.

The flash circuit of the flash device 16 has an arrangement depicted in FIG. 3. When the switch segment 33 short-circuits the contact points 32a and 32b, positive voltage (1.5 V) from the battery 30 is applied to a base of a transistor 37 via a resistor R1 and an F winding of an oscillating transformer 38, to turn on the transistor 37. Responsively a collector current of the transistor 37 flows via a P winding (primary side) of the oscillating transformer 38, so that electromotive force is generated through an S winding (secondary side) of the oscillating transformer 38 at a ratio of the numbers of turns in windings (S/P). The oscillating transformer 38 continues oscillation in the mutual induction of the P, S and F windings as combined. An output of the S winding (secondary side) is rectified by a rectifier 39, to charge the main capacitor 28.

There is connected a trigger capacitor 40. The finish of charging the main capacitor 28 is indicated to a user by actuation of a small neon lamp 41. For the discharge of the trigger capacitor 40, the synchro switch 29 is switched on. The voltage is boosted through a trigger transformer 42, and applied to a trigger terminal 43. Instantaneously part of xenon (Xe) gas enclosed in a discharge tube 44 is ionized to lower resistance through the discharge tube 44, which operates to emit flash light.

The front cover 18 is formed of opaque plastics, and has openings 46 through which the shutter release button 7, the counter window 10, the flash-emitting section 6 and the like emerge. The front cover 18 has a protruded portion 47 which covers the front wall of the cassette containing chamber 21, and is used as a grip held by a user's hand.

Under the flash-emitting section 6, the flash charge button 11 includes a flap portion 50, the operable lever 12 and a support 51. The flap portion 50 is formed integrally with the front cover 18 and has slits 49 for raising flexibility thereof. The operable lever 12 is disposed in front of a free end of the flap portion 50. The support 51 supports the operable lever 12 in rotatable fashion. The flap portion 50 is disposed in front of the switch segment 33. When the flap portion 50 is depressed, the switch segment 33 short-circuits the contact points 32a and 32b of the printed circuit board 27. The operable lever 12 is a plate having a semicircular shape and a small curvature. Rotational axial pins 52a and 52b as rotational shaft of a support structure are projected respectively from a top and a bottom of the operable lever 12. The axial pins 52a and 52b are inserted in respective receiving recesses 53a and 53b formed in the inside of the support 51, to mount the operable lever 12 on the front cover 18. The operable lever 12 is erected and folded in rotation about the recesses 53a and 53b.

Figure 4:
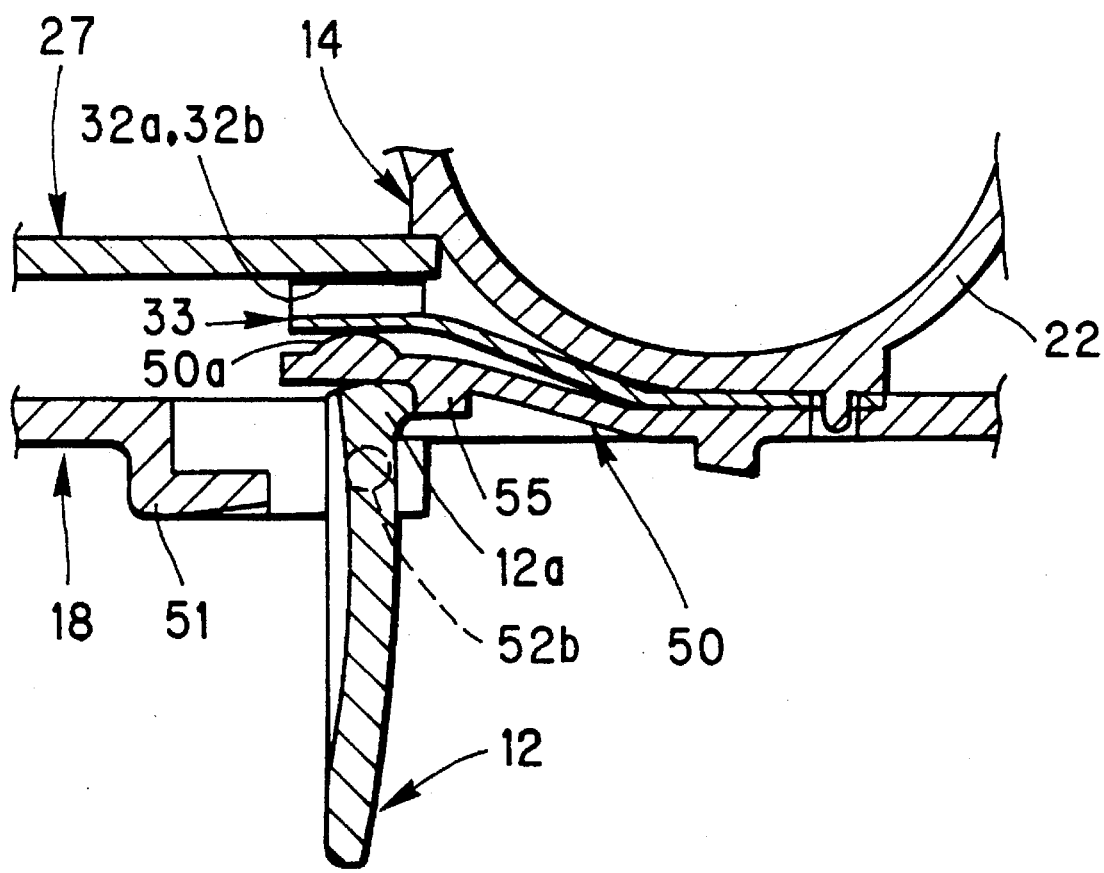
FIG. 4 is a partially cutaway cross section illustrating a charge switch and a charge button of the flash device of which the charge button has an erected position.

As illustrated in FIG. 4, the operable lever 12 mounted on the front cover 18 is set in the erected position relative to the front cover 18. A first end 12a of the operable lever 12 depresses the flap portion 50. The rear of the flap portion 50 has a projection 50a. With the flap portion 50 deformed resiliently, the projection 50a in turn depresses the switch segment 33. Then the switch segment 33 is contacted on the contact points 32a and 32b of the printed circuit board 27. There is a projection 55, disposed on the flap portion 50, for contact with the first end 12a of the operable lever 12 when the operable lever 12 has the erected position, to limit the swingable range of the operable lever 12. When the operable lever 12 is set in the erected position, the operable lever 12 is biased by the resiliency of the flap portion 50 forwardly. The operable lever 12 is kept in the erected position, for taking successive plural exposures.

Figure 5:
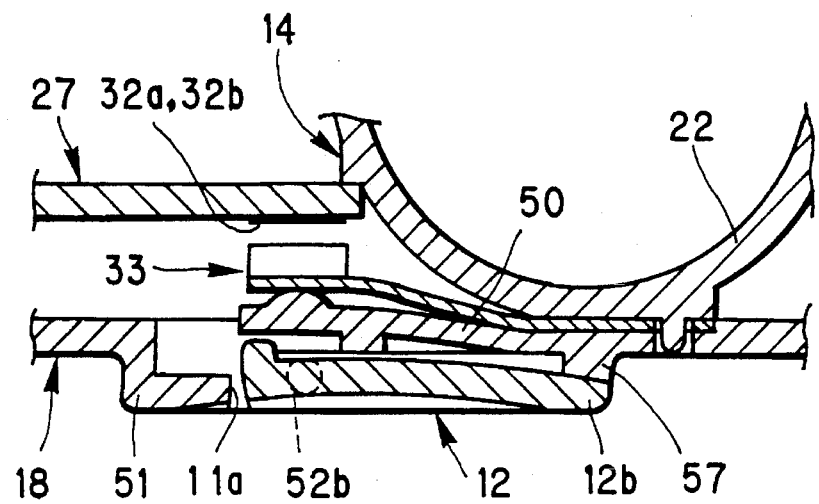
FIG. 5 is a partially cutaway cross section illustrating the charge switch and the charge button having a folded position.

As illustrated in FIG. 5, the operable lever 12 does not depress the flap portion 50 while the operable lever 12 has the folded position folded in flush fashion with the front cover 18. The switch segment 33 has a non-charge status, not contacted on the contact points 32a and 32b of the printed circuit board 27. The operable lever 12 has a second end 12b, which, in the folded position, is supported by a support projection 57 formed on the flap portion 50. Reference numeral 11a designates an access opening formed inside the support 51, which has a shape complementary to the shape of the operable lever 12. When the operable lever 12 has the folded position, the flash charge button 11 has a circular shape of FIG. 2, with visually neat appearance.

Figure 6:
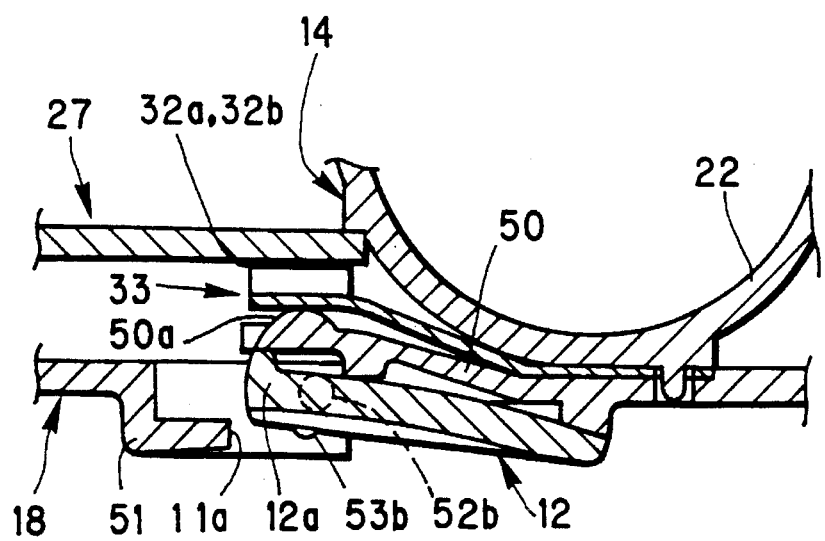
FIG. 6 is a partially cutaway cross section illustrating the charge switch and the charge button having a depressed position.

It is possible to charge the flash also when the operable lever 12 does not have the erected position. As illustrated in FIG. 6, the operable lever 12 in the folded position is depressed. The axial pins 52a and 52b move inside the recesses 53a and 53b rearward in nearly rectilinear fashion. The first end 12a of the operable lever 12 depresses the flap portion 50, of which the projection 50a depresses the switch segment 33, which short-circuits the contact points 32a and 32b. Note that it is necessary for a user to continue depressing the operable lever 12 before finish of the charging. This is because the switch segment 33 has resiliency to move away from the contact points 32a and 32b immediately when the operable lever 12 is stopped being pushed.

Operation of the above construction is hereinafter described. To take successive exposures in a room or outdoors with low brightness of a photographic subject, the operable lever 12 is pulled up to the erected position perpendicular to the front of the lens-fitted photo film unit 2, as indicated by the phantom line of FIG. 2. As illustrated in FIG. 1, the first end 12a of the operable lever 12 is contacted on the regulating projection 55 of the flap portion 50 and hindered from moving further. The operable lever 12 is set in the erected position. The first end 12a of the operable lever 12 depresses the flap portion 50 toward the rear. The flap portion 50 is deformed with resiliency, so that the projection 50a on its rear depresses the switch segment 33. In turn, the switch segment 33 is deformed with resiliency, and contacted on the contact points 32a and 32b of the printed circuit board 27 of the flash device 16.

When the switch segment 33 short-circuits the contact points 32a and 32b, positive voltage (1.5 V) from the battery 30 is applied to the base of the transistor 37 via the resistor R1 and the F winding of the oscillating transformer 38, to turn on the transistor 37. Responsively the collector current of the transistor 37 flows via the P winding (primary side) of the oscillating transformer 38, so that electromotive force is generated through the S winding (secondary side) of the oscillating transformer 38 at a ratio of the numbers of turns in windings (S/P). The oscillating transformer 38 continues oscillation in the mutual induction of the P, S and F windings as combined. The output of the S winding (secondary side) is rectified by the rectifier 39, to charge the main capacitor 28. When the main capacitor 28 and the trigger capacitor 40 are fully charged, the neon lamp 41 is turned on, to signal a charged status to the user.

When the neon lamp 41 illuminates, this indicates the finish of the charging operation. Then a photographic subject is targeted through the viewfinder 9. The shutter release button 7 is depressed. In response, the shutter blade in the exposure section 15 is rotated to open the light path between the taking lens 8 and the photo film. The shutter blade switches on the synchro switch 29 in the rotation. The charge stored in the trigger capacitor 40 is boosted through the trigger transformer 42, and applied to the trigger terminal 43. Instantaneously part of the xenon gas in the discharge tube 44 is ionized, and lowers the tube resistance, for discharge to emit flash light. The flash light as emitted is reflected by the reflector toward the front, is adjusted in distribution by the distribution compensating plate 35, and illuminates the photographic subject.

After taking an exposure, the winding wheel 5 is rotated, to wind an exposed portion of the photo film into the cassette in the cassette containing chamber 21. While the winding wheel 5 is rotated, the main capacitor 28 starts being charged, because the operable lever 12 keeps the switch segment 33 in contact with the contact points 32a and 32b of the printed circuit board 27. It is possible to minimize the time taken for charging the flash after winding of the photo film. There is no need of operation of charging the flash after each time of exposure. This is remarkably favorable in taking exposures one after another in series.

When the flash photography is finished, the operable lever 12 is shifted to the folded position folded on the front of the front cover 18. There is an occasion where the user forgets to fold the operable lever 12 to the folded position. However the orientation of the operable lever 12 in the erected position is characterized in being easy to discover, so that it is possible to prevent the operable lever 12 from standing in the erected position for a long time. Unnecessary use of the battery 30 can be avoided.

If a user desires only one exposure with flash light, flash photography can be effected without using the erected position of the operable lever 12. In the status of FIG. 5, the operable lever 12 in the folded position is depressed to come to the status in FIG. 6. The axial pins 52a and 52b of the operable lever 12 move rearward along the nearly straight path, to press the first end 12a against the flap portion 50, which is resiliently deformed. The projection 50a presses the switch segment 33. The switch segment 33 short-circuits the contact points 32a and 32b, to start charging the main capacitor 28. The operable lever 12 must be kept depressed before finish of the charging, with force over the resiliency of the flap portion 50 to return the operable lever 12 to its initial position and the resiliency of the switch segment 33 to come away from the contact points 32a and 32b. This avoids wasting the battery 30.

Figure 7A:
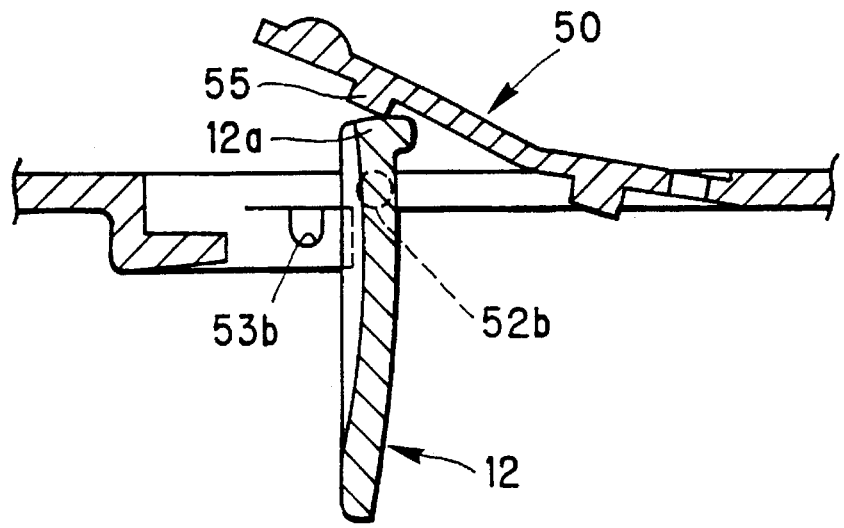
FIG. 7A is an explanatory view in cross section, illustrating an operable lever is being moved toward a front cover in course of production of the lens-fitted photo film unit.

Although the operable lever 12 may be secured to the front cover 18 by manual operation, the operable lever 12 can be secured thereto by automated operation. As illustrated in FIG. 7A, the operable lever 12 is moved toward the front cover 18 at first in a perpendicular direction. The first end 12a is contacted on, and pressed against, the regulating projection 55 of the flap portion 50. For the pressing, the flap portion 50 is deformed toward the rear, until the axial pins 52a and 52b of the operable lever 12 come to the rear of the support 51.

Figure 7B:
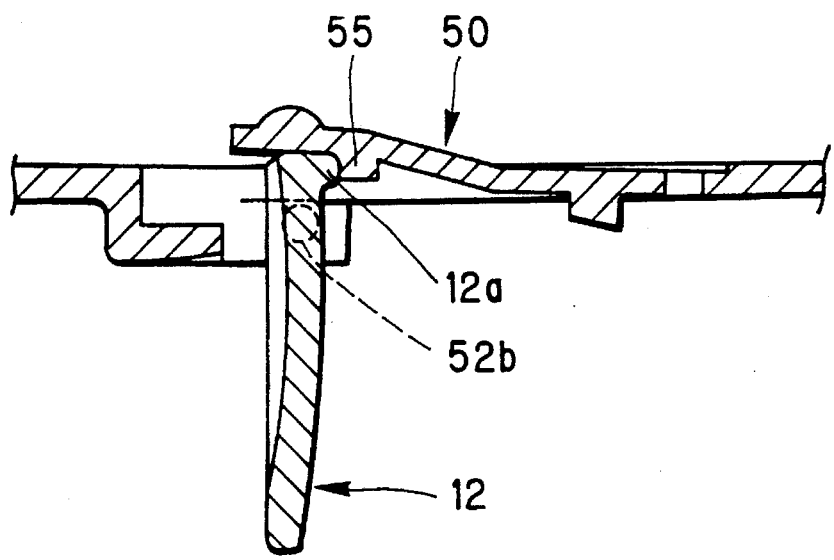
FIG. 7B is an explanatory view in cross section, illustrating the operable lever finishes being mounted.

The operable lever 12 is slid to the left next, as viewed in FIG. 7B. When the axial pins 52a and 52b come to the recesses 53a and 53b, the operable lever 12 is released from being pushed. In response, the axial pins 52a and 52b are received in the recesses 53a and 53b. The flap portion 50 returns to its initial position due to its resiliency. Then the operable lever 12 is assembled fully by the automatic assembling machine, which is advantageous in raising efficiency in production of the lens-fitted photo film unit 2.

Figure 8:
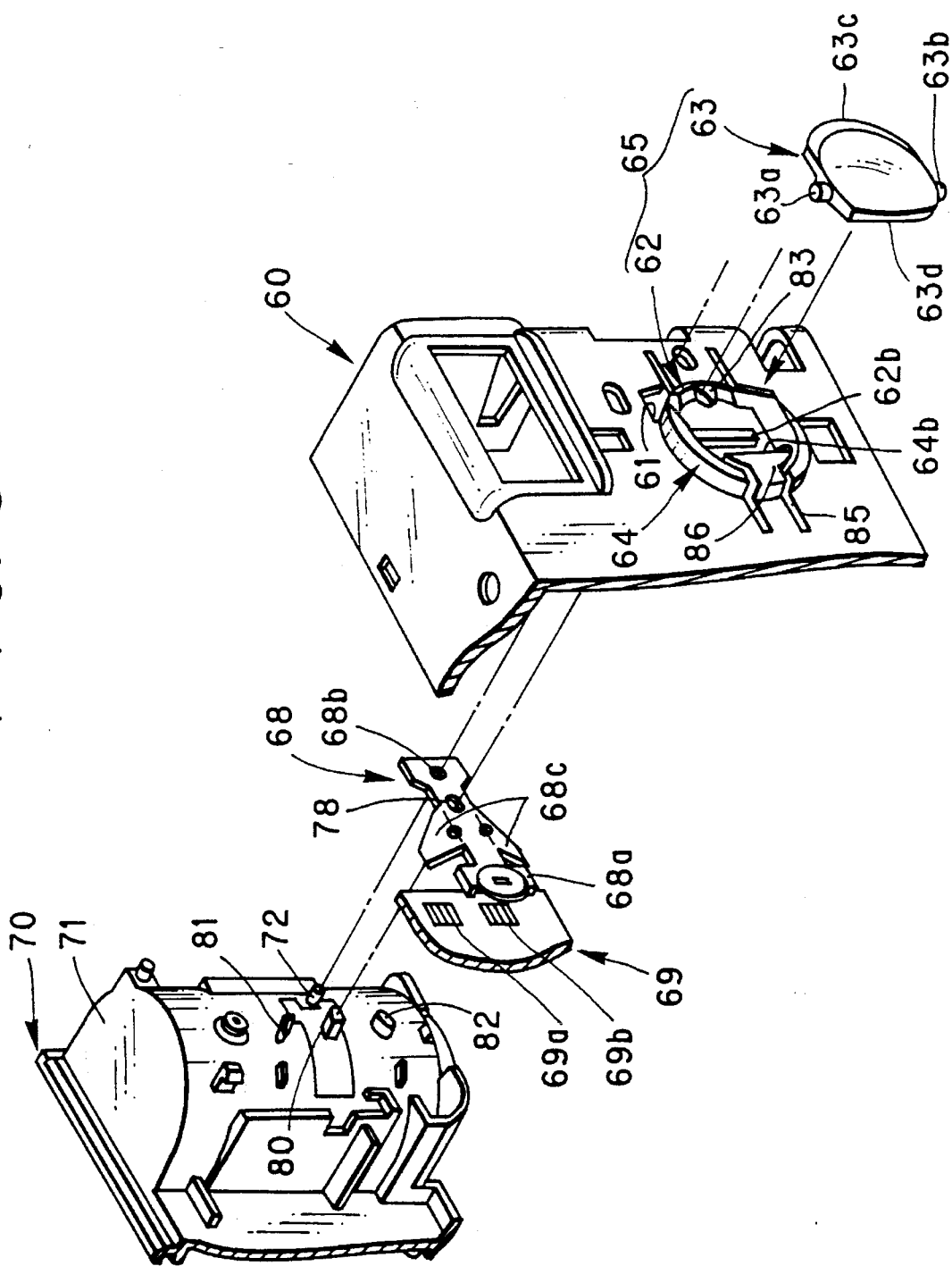
FIG. 8 is an exploded perspective view illustrating a charge button and a charge switch of another preferred embodiment, in which a switch segment is included in a plate spring.
Figure 9A:
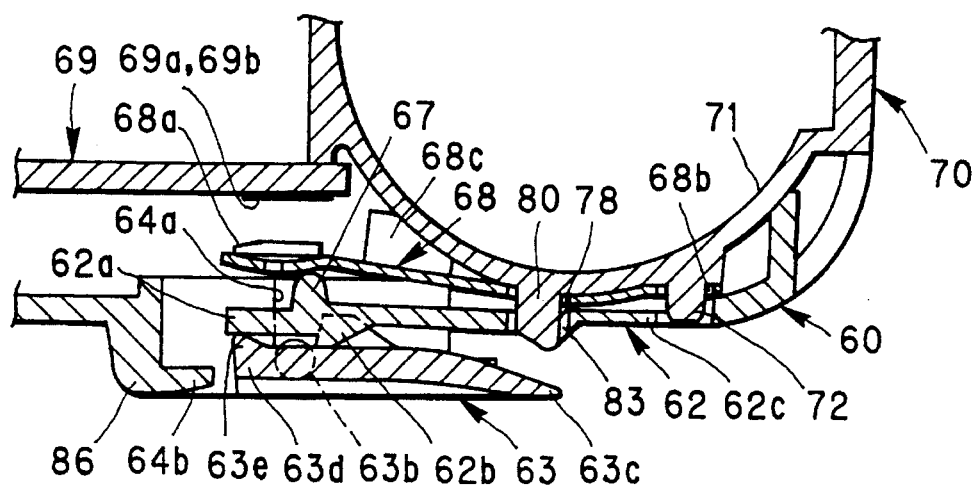
FIG. 9A is a partially cutaway cross section illustrating the charge switch and the charge button having a folded position.
Figure 9B:
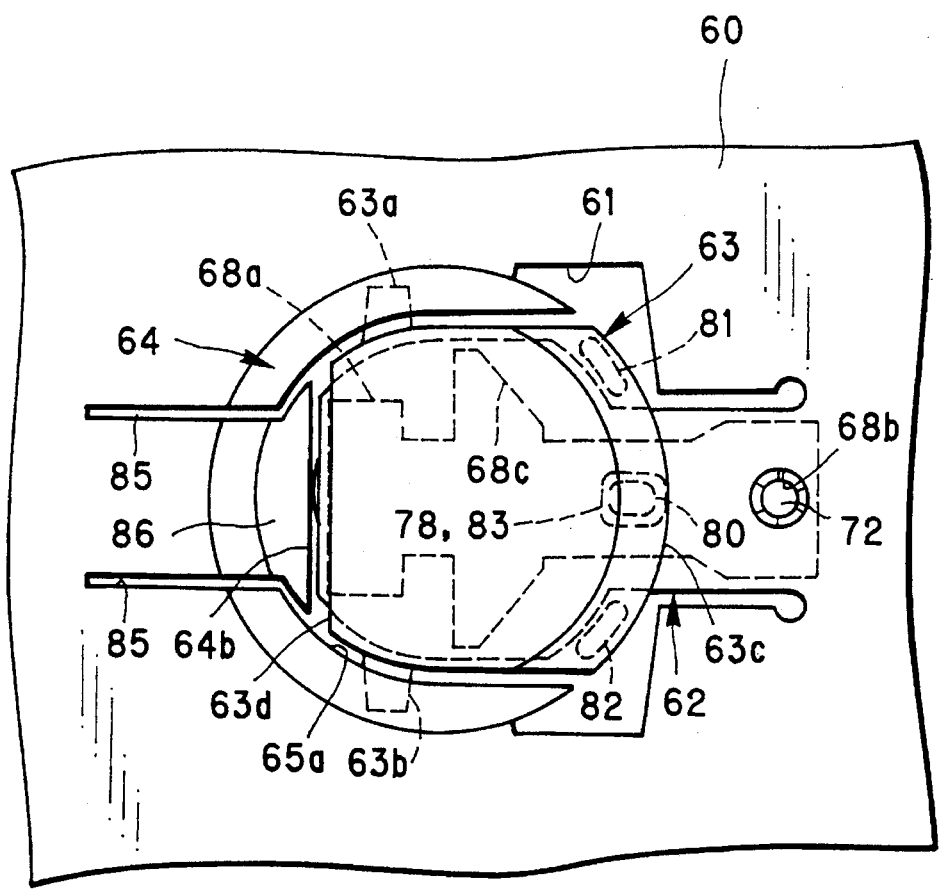
FIG. 9B is a front elevation illustrating the charge button having the folded position.
Figure 10:
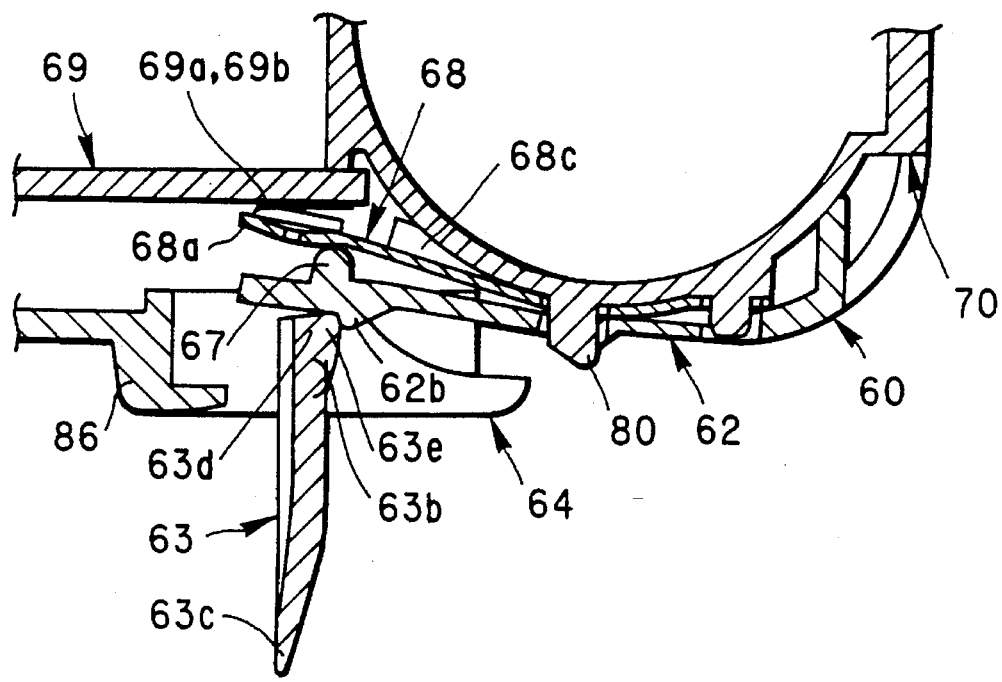
FIG. 10 is a partially cutaway cross section illustrating the charge switch and the charge button having an erected position.

Another preferred embodiment is now described. As illustrated in FIGS. 8, 9A and 9B, a front of a front cover 60 has a flash charge button 65 including a flap portion 62, an operable lever 63, and a support 64. The flap portion 62 is formed integrally with the front cover 60 and has slits/cutouts 61 for raising flexibility thereof. The operable lever 63 is disposed in front of a free end of the flap portion 62. The support 64 supports the operable lever 63 in rotatable fashion. The flash charge button 65 is similar to the flash charge button 11, and when the flash charge button 65 has the erected position erected from the front cover 60 as illustrated in FIG. 10, the flash device is charged in continuous fashion. The operable lever 63 has the folded position folded in flush fashion with the front cover 60. When the operable lever 63 in the folded position is depressed, the flash device is charged for one exposure. Reference numeral 65a designates an access opening.

The operable lever 63 has a front face concave with small curvature, for good manual touch while a finger contacts thereon. Rotational axial pins 63a and 63b as rotational shaft of a support structure are projected respectively from a top and a bottom of the operable lever 63, and are inserted in respective receiving recesses 64a formed in the inside of the support 64. The recesses 64a are open to the rear of the front cover 60. The operable lever 63 is rotated between the erected and folded positions about the axial pins 63a and 63b. When the operable lever 63 is depressed in the folded position, the axial pins 63a and 63b are moved to the rear within the recesses 64a.

A second end 63c of the operable lever 63 has a rear face inclined to reduce the thickness and define a space between it and the front cover 60. The space facilitates contact of a finger to pull up the operable lever 63. If a finger pushes the second end 63c inadvertently and lightly, the space helps depressing the second end 63c only at a small amount, in favorable fashion for good touch of the user's hand. A first end 63d of the operable lever 63 has a rear projection 63e projected rearward in a ridge shape. The rear projection 63e is a point of application in depression of the flap portion 62.

A front of a free end 62a of the flap portion 62 has a regulating projection 62b, which is contacted on the first end 63d to regulate rotation of the operable lever 63 when the operable lever 63 is shifted to the erected position in FIG. 10. When the operable lever 63 has the folded position, the first end 63d of the operable lever 63 is contacted on the free end 62a of the flap portion 62. The regulating projection 62b is contacted on the rear of the operable lever 63. The second end 63c of the operable lever 63 defines a space between it and the front of the front cover 60, so that the operable lever 63 is the more easy to apply a finger to.

The rear of the flap portion 62 has a projection 67 for contact with a switch segment 68a behind the flap portion 62. When the operable lever 63 has the erected position or is depressed in the folded position, the projection 67 depresses the switch segment 68a, which is contacted on contact points 69a and 69b of a printed circuit board 69. A plate spring 68 includes the switch segment 68a, a securing hole 68b and two bias plate portions 68c. The switch segment 68a is adapted to contact with the contact points 69a and 69b. The securing hole 68b is fitted on a pin 72 formed on the front wall of a photo film roll chamber 71 of a photo film containing section 70. The bias plate portions 68c bias the flap portion 62 and the operable lever 63 forwardly.

Figure 12:
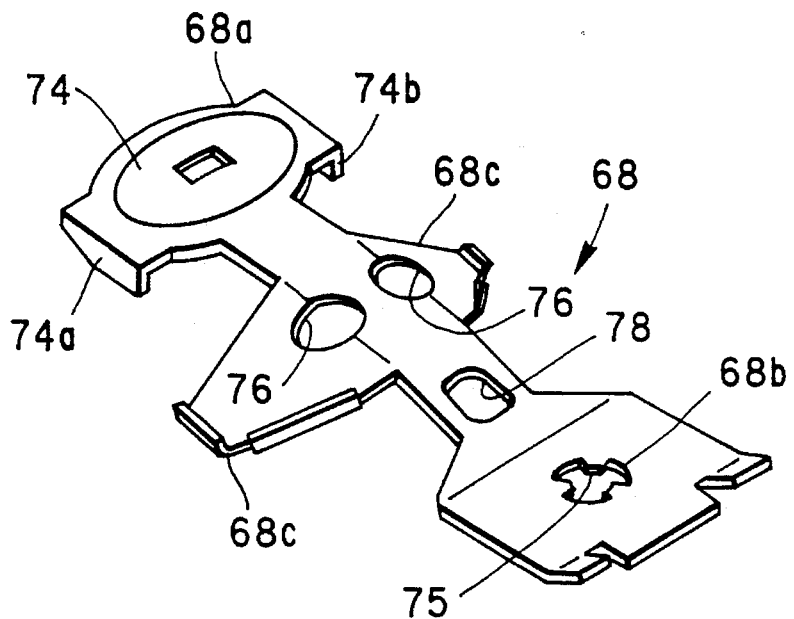
FIG. 12 is a perspective view illustrating a switch segment in a charge switch.

The switch segment 68a of the plate spring 68, as illustrated in FIG. 12, has a click area 74 curved to have resistance with click to a finger depressing the operable lever 63 manually. Two contact ridges 74a and 74b are projected from sides of the click area 74 toward the printed circuit board 69. Preferred thickness of the click area 74 is 0.1 mm in view of suitability in the resistance with click. The securing hole 68b has three inner teeth 75 projected toward its center. The pin 72 is forcibly inserted into the securing hole 68b between the inner teeth 75, which prevent the plate spring 68 from moving away from the photo film containing section 70.

Each of the bias plate portions 68c has the thickness of 0.1 mm, has a wing shape for the purpose of biasing the flap portion 62 and the operable lever 63, and is inclined toward the photo film containing section 70. The bias plate portions 68c are contacted on the front wall of the photo film roll chamber 71. When the switch segment 68a is depressed, the bias plate portions 68c are spread on the outside of the photo film roll chamber 71. When the switch segment 68a is released from being pressed, the bias plate portions 68c come to their initial position due to their resiliency, to move the flap portion 62 and the operable lever 63 forwardly. Edges of the bias plate portions 68c nearer to the photo film roll chamber 71 are bent for smooth contact thereon. Respective holes 76 are formed in the bias plate portions 68c for adjusting resiliency of the bias plate portions 68c.

The resiliency of the plate spring 68 biases the flap portion 62 and the operable lever 63, for the purpose of avoiding contacting the switch segment 68a on the contact points 69a and 69b on accidental occasions except for depressed occasions. Should the resiliency of the flap portion 62 be used for biasing the operable lever 63, and should the lens-fitted photo film unit be left to stand in high temperature with the operable lever 63 shifted to the erected position 63, then the flap portion 62 would not recover its initial form even despite the return of the operable lever 63 to the folded position. The flap portion 62 would be likely to depress the switch segment, so the battery 30 might be wasted. However, the resiliency of the plate spring 68 operates advantageously over a construction without it, because a metal bias plate portion of the plate spring 68 is less influenced by heat. The metal bias plate portion is included in one piece of the plate spring 68, and this is further effective in that no greater number of parts is required, and thus there is no rise in the cost.

As illustrated in FIG. 9A, a fixed end 62c of the flap portion 62 connected to the front cover 60 is provided with reduced thickness, which reduces load of the flap portion 62 to the bias plate portions 68c.

The plate spring 68 has a hole 78 in addition to the securing hole 68b. In the hole 78 is inserted a support projection 80 formed on the photo film containing section 70. If the lens-fitted photo film unit is placed with its front directed downward, it is likely in the folded position that the second end 63c of the operable lever 63 is depressed by the weight of the photo film unit. The flap portion 62 might be depressed, and the switch segment 68a might short-circuit the contact points 69a and 69b of the printed circuit board 69, to waste the battery 30. However the arrangement of the support projection 80 is advantageous in overcoming such a problem: if the second end 63c is pushed forcibly, the support projection 80 supports the rear of the second end 63c to avoid depressing the flap portion 62. The present embodiment has not only the support projection 80 but support projections 81 and 82 for supporting corners of the second end 63c.

Figure 13:
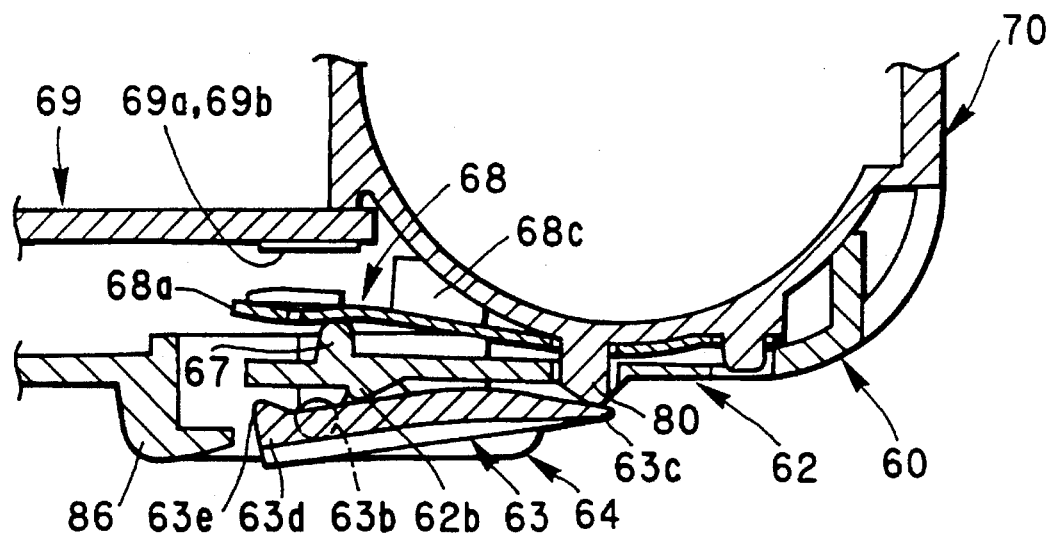
FIG. 13 is a partially cutaway cross section illustrating the charge switch and the charge button of which a second end of an operable lever is pushed.

The support projection 80 for supporting the center comes through the hole 78 in the plate spring 68 and through a hole 83 in the flap portion 62, and appears in front of the front cover 60. The support projections 81 and 82 for supporting the sides come through the slits/cutouts 61 in the front cover 60, and appear in front of the front cover 60. As illustrated in FIG. 13, the rear of the second end 63c is supported by the support projections 80, 81 and 82 to prevent the flap portion 62 from being depressed if the second end 63c is pushed. Accordingly the flash device is not wastefully charged, and the battery is prevented from being wasted. Note that the support projection 80 operates also for defining the position of retaining the plate spring 68 without deviation.

Figure 11:
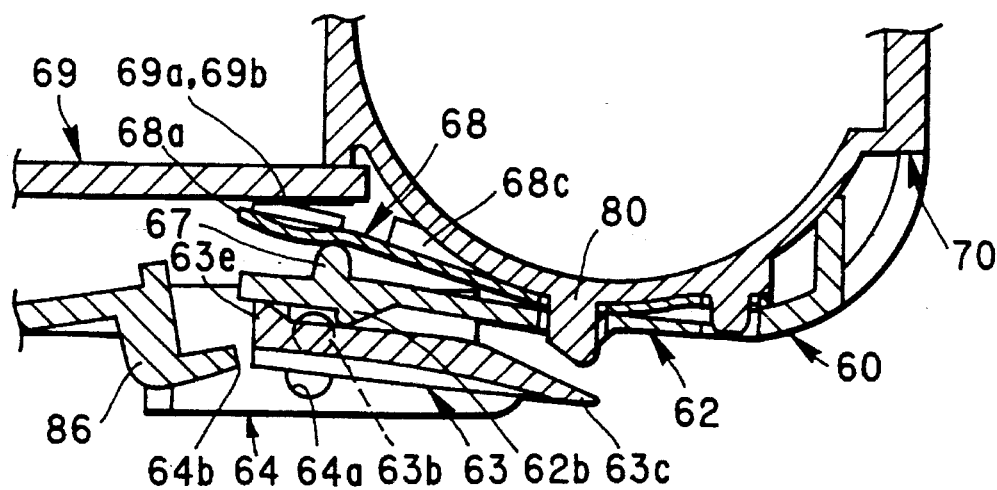
FIG. 11 is a partially cutaway cross section illustrating the charge switch and the charge button having a depressed position.

The flash charge button 11 is provided with slits 85 which are open to a straight edge 64b face to face with the first end 63d of the operable lever 63. If it were not for those, it would be likely that a finger or a nail would be a straight edge of the support 51 face to face with the first end 12a of the operable lever 12 before depression of the operable lever 12, to lower operability. The slits 85 are advantageous in that a tongue portion 86 between them is resilient for better operability. When a finger in operation touches the straight edge 64b as illustrated in FIG. 11, the straight edge 64b is partially deformed at the tongue portion 86 inwardly.

Figure 14:
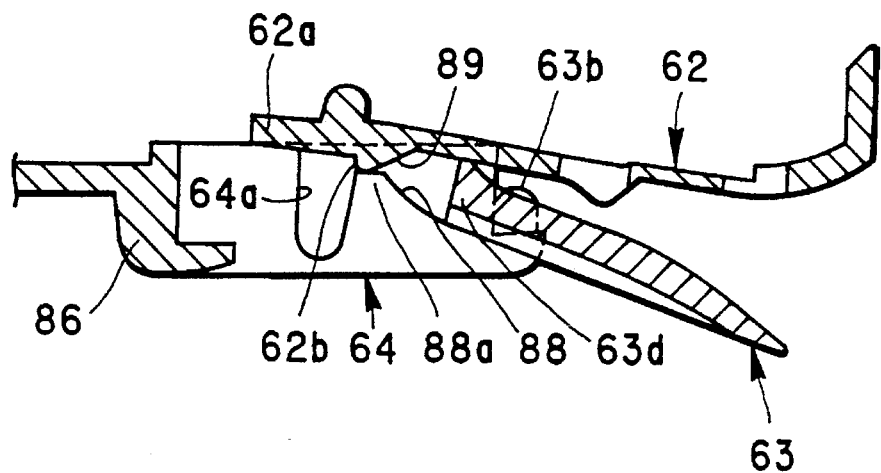
FIG. 14 is an explanatory view in cross section, illustrating the operable lever is being moved along a front cover in course of production of the lens-fitted photo film unit.

The front cover 60 is secured to the front of the photo film containing section 70 after the operable lever 63 is mounted on the front cover 60. Assemblage of the operable lever 63 into the support 64 of the flash charge button 65 is similar to that of the flash charge button 11 as described above. The first end 63d is contacted on, and pressed against, the flap portion 62, which is deformed toward the rear. The operable lever 63 is slid toward the free end 62a. The axial pins 63a and 63b are received in the recesses 64a. Unlike the former embodiment, there are formed an inclined face 88 inside the support 64 and an inclined face 89 on the regulating projection 62b of the flap portion 62, as illustrated in FIG. 14.

Figure 15:
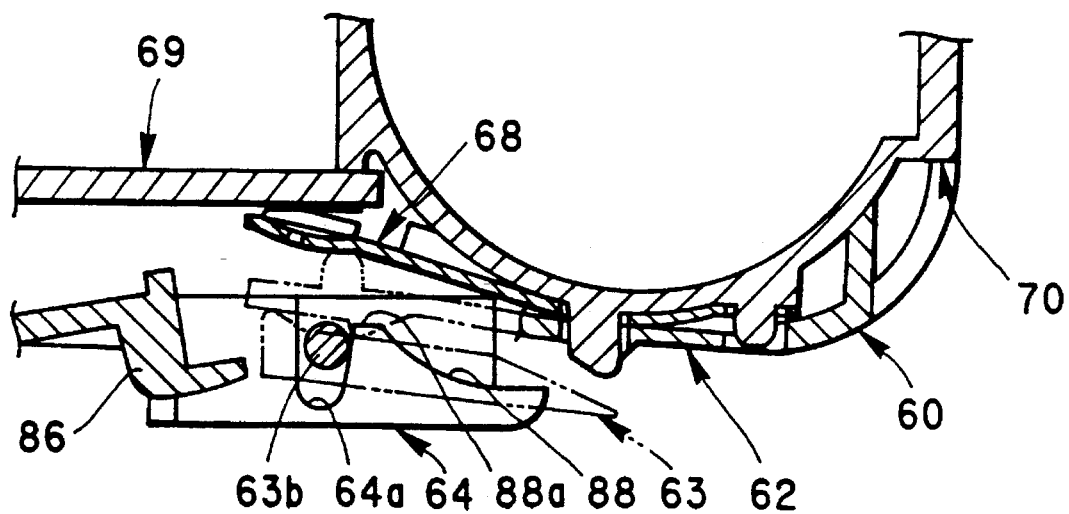
FIG. 15 is a partially cutaway cross section illustrating the charge switch and the charge button having a depressed position.

This being so, the operable lever 63 is moved toward the front of the front cover 60 in small inclination, before the axial pins 63a and 63b are inserted in the slits/cutouts 61. The first end 63d is inserted between the flap portion 62 and the support 64. The operable lever 63 is slid toward the free end 62a of the flap portion 62. The axial pins 63a and 63b are guided by the inclined face 88 and inserted in the recesses 64a. The first end 63d is not stopped by the regulating projection 62b while guided by the inclined face 88. As the operable lever 63 is moved in the inclination, the flap portion 62 is shifted only at a small amount, and not deformed irrecoverably. A top 88a of the inclined face 88, as illustrated in FIG. 15, has such a size as to keep the operable lever 63 from moving away from the front cover 60: the top 88a is located behind the rearmost position of a range where the axial pins 63a and 63b is shiftable in the recesses 64a.

Figure 16:
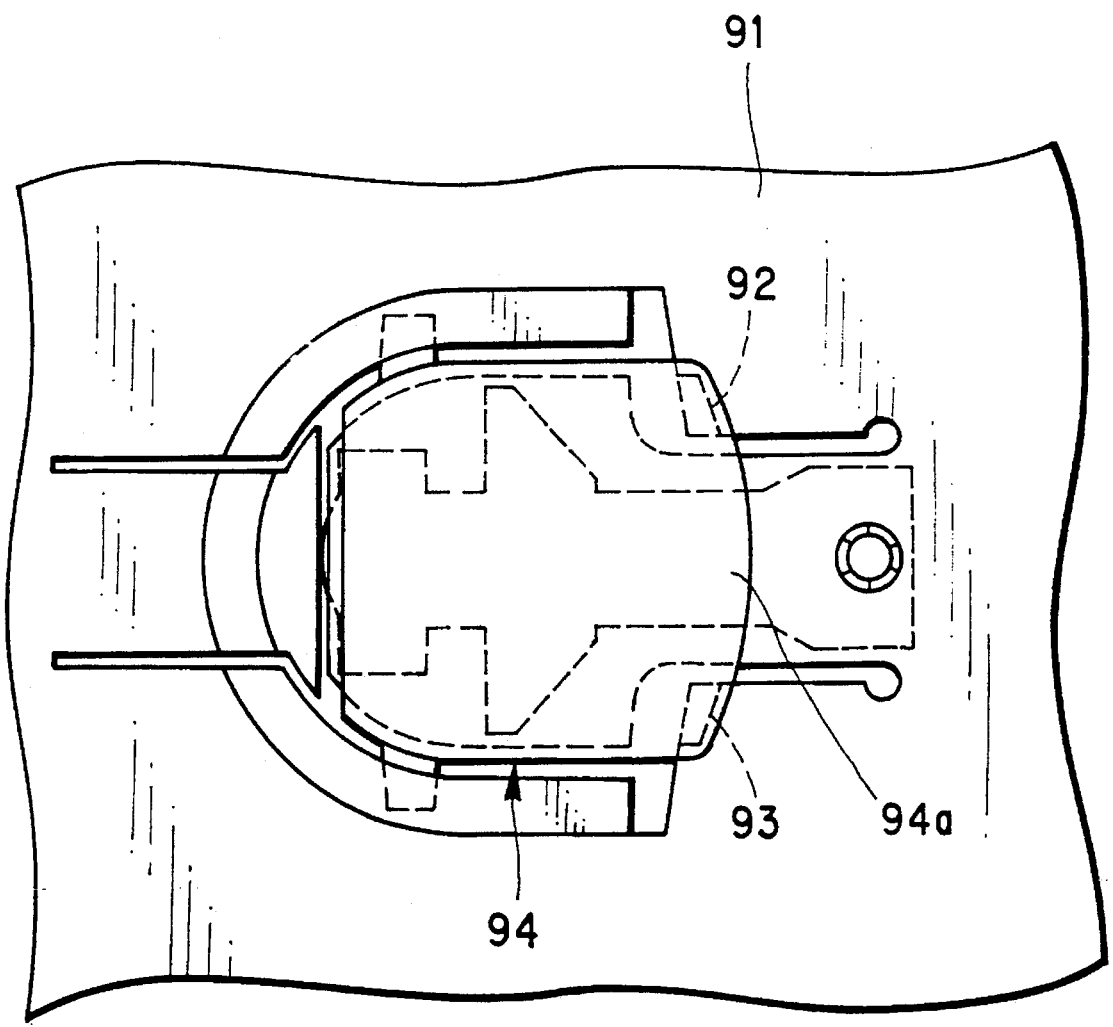
FIG. 16 is a front elevation illustrating another preferred charge button.

In the flash charge button 65, the support projections 80, 81 and 82 included in the photo film containing section 70 support the rear of the second end 63c. It is possible to eliminate the support projections 81 and 82 while using the support projection 80 for the center, or eliminate the support projection 80 while using the support projections 81 and 82 for the corners. Furthermore, support projections 92 and 93 may be formed on a front cover 91 as illustrated in FIG. 16 to support the rear of a second end 94a of an operable lever 94. Note that the second end 94a should be extended to cover the support projections 92 and 93 sufficiently.

Figure 17:
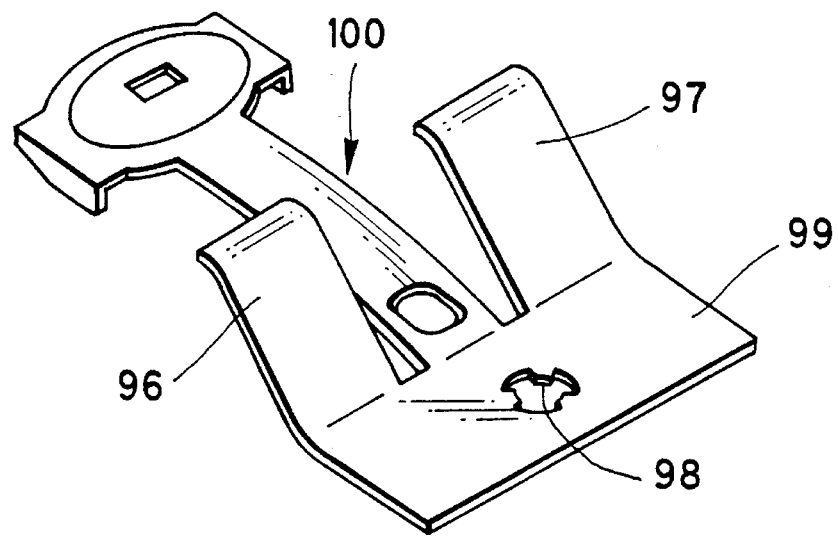
FIGS. 17 and 18 are perspective views illustrating other preferred switch segments.
Figure 18:
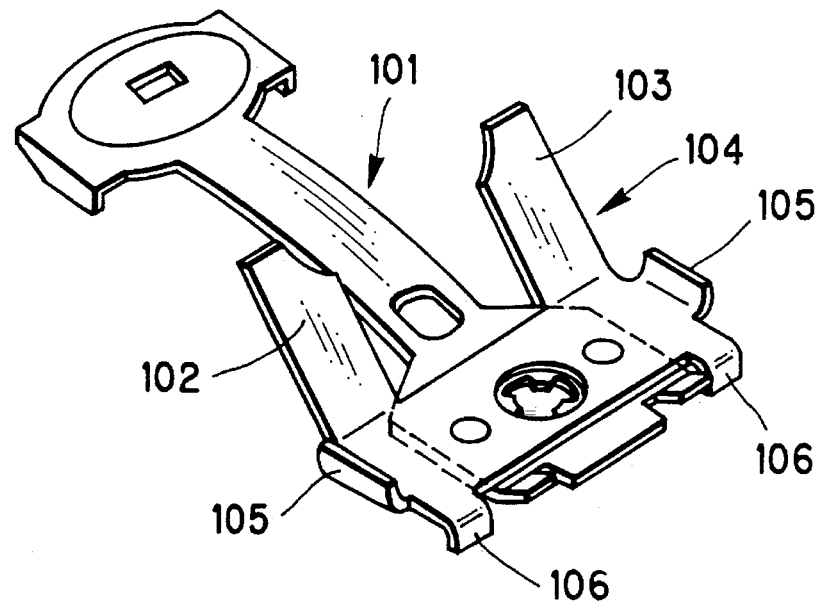

In the above embodiment, the plate spring 68 has the bias plate portions 68c of the wing shape in contact with the front wall of the photo film roll chamber 71. Alternatively it is possible as illustrated in FIG. 17 to use a plate spring 100 having a switch segment, in which a flat portion 99 has a hole 98 and bias plate portions 96 and 97 projected therefrom. It is also possible in FIG. 18 to use a plate spring 101 having a switch segment, to which a plate 104 having two bias plate portions 102 and 103 is connected by means of spot welding. This makes it also possible to form the plate 104 with greater thickness than the plate spring 101 to raise the resiliency and force of bias to the flap portion 62 and the operable lever 63. Reference numerals 105 and 106 designate side ridges used for a part feeder in production of the lens-fitted photo film unit: supply of the plate 104 to the plate spring 101, and/or assemblage of the plate 104 and the plate spring 101 into the photo film containing section 70.

Figure 19A:
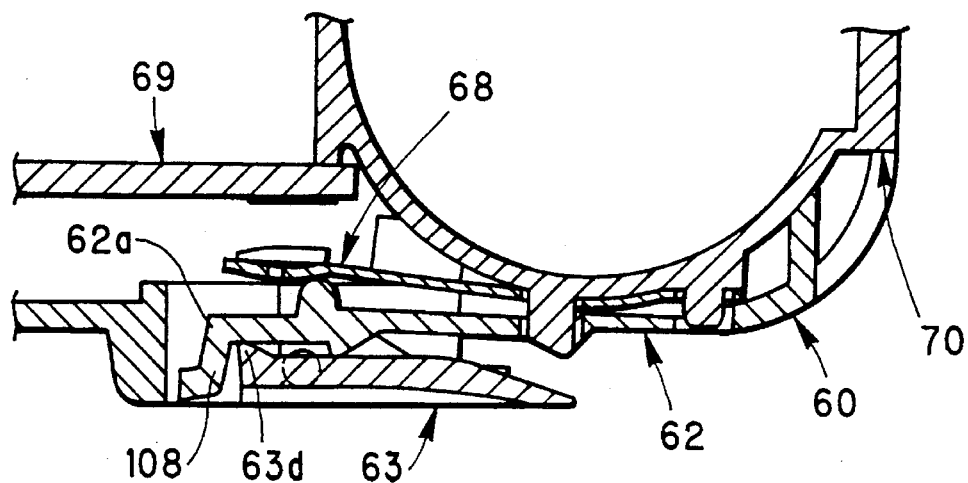
FIG. 19A is a partially cutaway cross section illustrating a charge switch and a charge button of still another preferred embodiment.
Figure 19B:
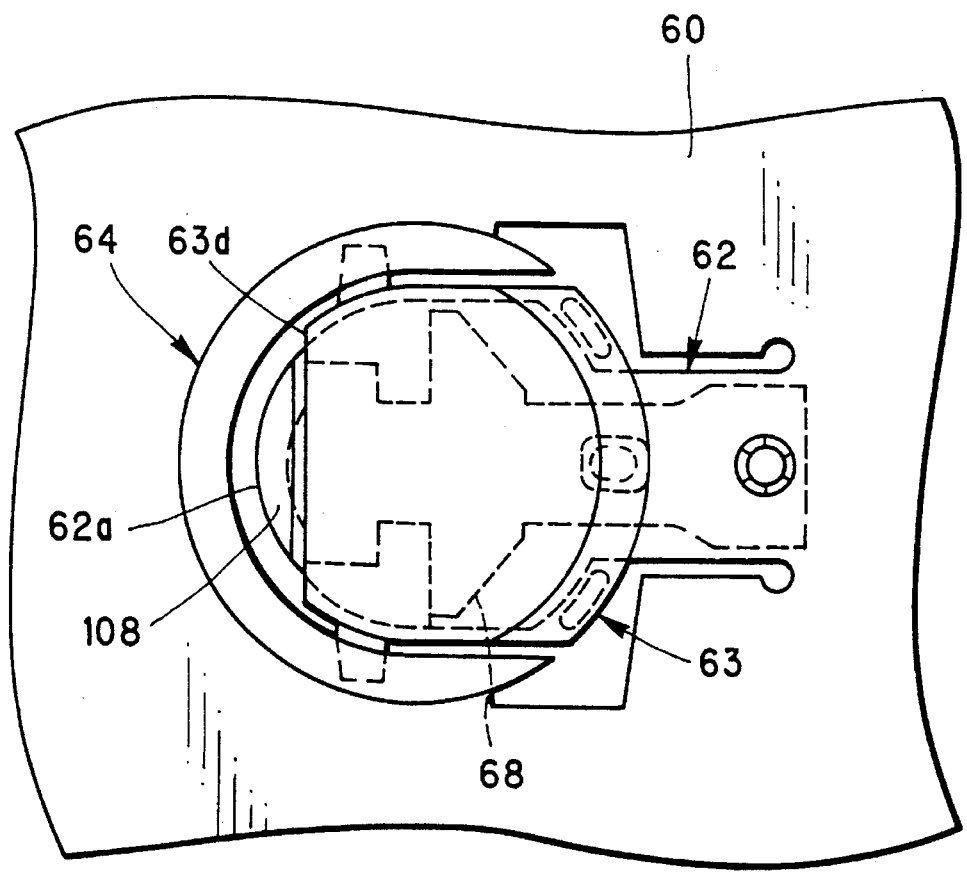
FIG. 19B is a front elevation illustrating the charge button.
Figure 20:
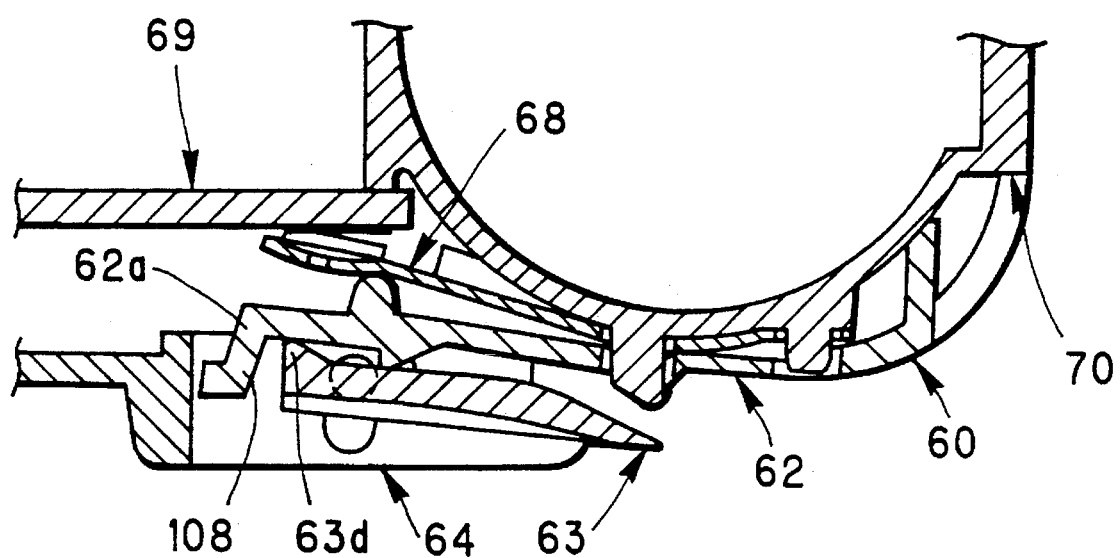
FIG. 20 is a partially cutaway cross section illustrating the charge switch and the charge button having the depressed position.

In the above embodiment, the tongue portion 86 is depressible in the support 64 at the straight edge 64b. Alternatively there can be formed a front ridge 108 on the free end 62a of the flap portion 62, to constitute a straight edge face to face with the first end 63d of the operable lever 63, as illustrated in FIGS. 19A and 19B. As illustrated in FIG. 20, the operable lever 63 and the front ridge 108 are depressible at the same time if receiving force from a finger. The use of the front ridge 108 is advantageous in higher operability.

The operable lever 63 is located directly in front of the flap portion 62. If the lens-fitted photo film unit is dropped inadvertently to distort the front cover 60 remarkably, there is no difficulty of removal of the operable lever 63 from the recesses 64a until thrusting into the front cover 60.

In the above embodiments, the operable lever has the semicircular shape and the flash charge button in the folded position has a circular shape. It is also possible to shape the flash charge button rectangularly, elliptically or triangularly. The switch segment is secured to the photo film containing section, but may be secured to the rear of the flap portion in adhesion or hook engagement, or may be secured to the printed circuit board. It is possible that a bias member for biasing the flap portion is separate from a switch segment. In the above, the operable lever is located on the front of the front cover. An alternative operable lever, however, may be located on a side face of a front cover, or on the rear or a rear cover.

In the above the pins as rotational shaft of the operable lever are directed vertically relative to the orientation of the lens-fitted photo film unit. Alternatively pins of an operable lever may be directed horizontally. In the above the first end of the operable lever is located to the left of its second end to swing toward the left. The present invention is of course applicable to a flash charge button in which a first end of an operable lever is located to the right of its second end to swing toward the right.

In the above embodiments, the two contact points are short-circuited by the switch segment. The present invention is also applicable to a flash charge switch including a single contact point and a switch segment for contact with the single contact point.

In the above, the operable lever is supported by use of the axial pins. The present invention is applicable to another operable latch device in which an operable member is formed in connection to the front cover at a straight edge, and supported by use of a thinly formed connecting portion in rotatable fashion.

In the above, the switch segment is depressed by the operable lever indirectly via the flap portion. The present invention is applicable to a flash charge button which includes no flap portion, and in which a front of a switch segment appears externally to be depressed by an operable lever.

In the above, the operable lever is rotatable about the axial pins between the erected and folded positions. The present invention is applicable to a flash charge button including an operable sliding member movable straight between the erected and folded positions.

In the above, the operable lever is rotatable between the folded position and the erected position, and also movable between the folded position and a depressed position. The present invention is also applicable to a flash charge button in which an operable lever is rotatable between the folded position and the erected position, but not depressible to any position behind the folded position.

Although the present invention has been fully described by way of the preferred embodiments thereof with reference to the accompanying drawings, various changes and modifications will be apparent to those having skill in this field. Therefore, unless otherwise these changes and modifications depart from the scope of the present invention, they should be construed as included therein.

What is claimed is:

1. A lens-fitted photo film unit in which photo film is pre-contained in a photo film containing section, an exposure is taken on said photo film via a photographic light path, an electronic flash device is secured in front of said photo film containing section, said electronic flash device includes a circuit board having a flash circuit, a flash-emitting section, and a charge switch for charging said flash circuit, said charge switch includes at least one contact point and a movable switch segment for contact with said contact point to switch on charging of said flash circuit, and a front cover is secured to cover a front of said circuit board, said lens-fitted photo film unit comprising:

an operable lever, having first and second ends, said first end being disposed in front of said switch segment, said second end being disposed opposite to said first end with reference to a face of said front cover; and a support structure for supporting said operable lever in shiftable fashion between erected and folded positions, said second end being erected from said front cover when having said erected position, and being folded down on said front cover when having said folded position, and when having said erected position, said first end depressing said switch segment for contact with said contact point.

2. A lens-fitted photo film unit as defined in claim 1, further comprising an access opening formed in said front cover, said operable lever being disposed at said access opening, said first end depressing said switch segment through said access opening.

3. A lens-fitted photo film unit as defined in claim 2, wherein said support structure includes a rotational shaft, disposed near to said first end, for supporting said operable lever in rotatable fashion.

4. A lens-fitted photo film unit as defined in claim 3, wherein said rotational shaft is extended vertically with reference to orientation of said light path.

5. A lens-fitted photo film unit as defined in claim 4, wherein said second end of said operable lever is disposed nearer to said light path than said first end.

6. A lens-fitted photo film unit as defined in claim 3, wherein said operable lever is further movable between said folded position and a depressed position depressed toward an inside of said front cover and behind said folded position, and when said operable lever has said depressed position, said first end depressing said switch segment for contact with said contact point.

7. A lens-fitted photo film unit as defined in claim 6, further comprising a flap portion, having fixed and free ends, said fixed end being disposed behind said second end of said operable lever having said folded position and formed in connection to an edge of said access opening in said front cover, said free end being disposed between said switch segment and said first end of said operable lever, and depressed by said first end to depress said switch segment.

8. A lens-fitted photo film unit as defined in claim 7, further comprising a regulating projection, projected from said flap portion to a front, contacted on said first end of said operable lever having said erected position, for preventing said operable lever from rotating beyond said erected position.

9. A lens-fitted photo film unit as defined in claim 7, further comprising a rear projection, projected from said first end of said operable lever to a rear, contacted on said flap portion when having said depressed position, for shortening a path from said folded position to said depressed position.

10. A lens-fitted photo film unit as defined in claim 7, further comprising a front ridge, projected from said free end of said flap portion to be substantially flush with said operable lever, for facilitating depression of said operable lever to said depressed position together with said flap portion.

11. A lens-fitted photo film unit as defined in claim 10, wherein said rotational shaft is projected from said operable lever; and said support structure further includes a receiving recess, formed in a rear of said front cover, for supporting said rotational shaft in rotatable fashion, said rotational shaft being slid to a rear toward an outside of said receiving recess when said first end of said operable lever is moved to said depressed position.

12. A lens-fitted photo film unit as defined in claim 11, wherein said switch segment has resiliency for returning away from said contact point, and said flap portion has resiliency for biasing said operable lever from said depressed position to said folded position.

13. A lens-fitted photo film unit as defined in claim 11, further comprising a plate spring in which said switch segment is included, and which is disposed behind said flap portion, for biasing said flap portion and said operable lever to a front.

14. A lens-fitted photo film unit as defined in claim 13, wherein said plate spring includes:

a first plate portion extended from said switch segment toward said fixed end of said flap portion; and a second plate portion disposed on said first plate portion and opposite to said switch segment, and fixedly secured to said photo film containing section.

15. A lens-fitted photo film unit as defined in claim 14, wherein said plate spring further includes third and fourth plate portions respectively disposed on sides of said first plate portion, extended in directions opposite to each other, inclined toward said photo film containing section, for pushing said flap portion via said first plate portion.

16. A lens-fitted photo film unit as defined in claim 14, wherein said plate spring further includes third and fourth plate portions disposed on said second plate portion, extended substantially along sides of said first plate portion, inclined toward said flap portion, for pushing said flap portion.

17. A lens-fitted photo film unit as defined in claim 16, wherein said third and fourth plate portions are formed integrally with said second plate portion.

18. A lens-fitted photo film unit as defined in claim 16, wherein said plate spring further includes a fifth plate portion overlaid on said second plate portion and fixedly secured thereto, said third and fourth plate portions being formed integrally with said fifth plate portion.

19. A lens-fitted photo film unit as defined in claim 13, wherein said fixed end of said flap portion has smaller thickness for reducing load of flap portion to said switch segment.

20. A lens-fitted photo film unit as defined in claim 11, wherein before mounting said operable lever on said front cover, said first end of said operable lever pushes said flap portion to shift said flap portion, then said operable lever is moved toward said free end of said flap portion, and subsequently said rotational shaft of said operable lever is inserted in said receiving recess.

21. A lens-fitted photo film unit as defined in claim 20, further comprising an inclined face formed on a rear of said front cover, for guiding said first end of said operable lever toward said receiving recess, said inclined face having a top for preventing said operable lever from moving away from said front cover.

22. A lens-fitted photo film unit as defined in claim 20, further comprising:

a regulating projection, projected from said flap portion to a front, contacted on said first end of said operable lever having said erected position, for preventing said operable lever from rotating beyond said erected position; and an inclined face, formed on said regulating projection, for guiding said operable lever toward said free end of said flap portion before said operable lever is mounted on said front cover.

23. A lens-fitted photo film unit as defined in claim 2, further comprising two slits, formed in a front of said front cover, open to said access opening, and extended toward said first end of said operable lever, for defining a depressible portion therebetween.

24. A lens-fitted photo film unit as defined in claim 1, further comprising a support projection, extended outwardly to a face of said front cover, contacted on an inside of said second end of said operable lever having said folded position, for preventing said second end from being depressed to said front cover.

25. A lens-fitted photo film unit as defined in claim 24, wherein said support projection is projected from said photo film containing section toward said front, and disposed to come through said front cover.

26. A lens-fitted photo film unit as defined in claim 24, wherein said support projection is formed on said front cover.

27. A lens-fitted photo film unit in which photo film is pre-contained in a photo film containing section, an exposure is taken on said photo film via a photographic light path, an electronic flash device is secured in front of said photo film containing section, said electronic flash device includes a circuit board having a flash circuit, a flash-emitting section, and a charge switch for charging said flash circuit, said charge switch includes at least one contact point and a movable switch segment for contact with said contact point to switch on charging of said flash circuit, and a front cover is secured to cover a front of said circuit board, said lens-fitted photo film unit comprising:

an access opening formed in said front cover, at least a part of said access opening being disposed near to said switch segment;

a flap portion, having fixed and free ends, said fixed end being formed in connection to an edge of said access opening, said free end being disposed near to said switch segment;

an operable lever, having first and second ends, said first end being disposed outside said free end of said flap portion, said second end being disposed outside said fixed end of said flap portion;

a rotational shaft for supporting said operable lever in rotatable fashion between erected and folded positions, said second end being erected from said front cover when having said erected position, and being folded down on said front cover when having said folded position, and when having said erected position, said first end depressing said free end of said flap portion for contact of said switch segment with said contact point; and said operable lever being further movable between said folded position and a depressed position depressed toward an inside of said front cover and behind said folded position, and when said operable lever has said depressed position, said first end depressing said free end of said flap portion.

28. A lens-fitted photo film unit in which photo film is pre-contained in a photo film containing section, an exposure is taken on said photo film via a photographic light path, an electronic flash device is secured in front of said photo film containing section, said electronic flash device includes a circuit board having a flash circuit, a flash-emitting section, and a charge switch for charging said flash circuit, said charge switch includes at least one contact point and a movable switch segment for contact with said contact point to switch on charging of said flash circuit, and a front cover is secured to cover a front of said circuit board, said lens-fitted photo film unit comprising:

said switch segment being depressible for coming in contact with said contact point; and an operable latch device, associated with said front cover in shiftable fashion between a latch position and a home position relative to said front cover, said switch segment being kept depressed when said operable latch device has said latch position.

* * * * *